C. H. BURR.
SLOP-HOPPER.

No. 179,514.  Patented July 4, 1876.

Witnesses.
W. H. Peckham
Frank H. Collier

Inventor:
Charles H. Burr

UNITED STATES PATENT OFFICE.

CHARLES H. BURR, OF CHICAGO, ILLINOIS, ASSIGNOR OF ONE-HALF HIS RIGHT TO GEORGE W. BURR, OF SAME PLACE.

IMPROVEMENT IN SLOP-HOPPERS.

Specification forming part of Letters Patent No. 179,514, dated July 4, 1876; application filed March 18, 1876.

*To all whom it may concern:*

Be it known that I, CHARLES H. BURR, of the city of Chicago, county of Cook, State of Illinois, have invented certain new and useful Improvements in Slop - Pails, called "Burr's Adjustable Slop-Pail, with Stench - Trap and Surface-Drain Combined," of which the following is a specification:

The nature of my invention or improvements consists in the employment of a movable slop - pail, with a perforated bottom, and having a cover for the top; also, a bail and handle at the side of it, to assist in emptying the pail, which is placed in a stationary stench-trap, and can be lifted out and emptied of the accumulated débris when desired, the trap being partly filled with water to prevent the stench and foul gases from returning from the drain or sewer, and in the employment of a pipe leading from the trap for the purpose of drawing off the fluid thereof; also, with orifices or openings at the sides of the trap, and level with the top of it, whereby and through which waste-water from the sinks and wash - tubs is drained off by running a pipe from either or both to their respective orifice or opening in the trap, (thereby saving the extra expense for stench-traps for sinks and wash - tubs ;) also, an opening between the slop-pail and trap, forming a surface-drain for the purpose of drawing off the waste surface water which may be in yards, areas, and on floors, allowing the surface-water to pass between the flange on bottom of pail and the inside of trap, then through the trap to the drain or sewer—the pail resting on small lugs projecting from the inside of a flange on top part of trap; or the lugs can be dispensed with when surface-drain is not needed, and the pail can then rest on top of trap where the flange is formed, and being adjustable therein—the trap being fastened to the floor by nails or screws put through said flange, it having holes drilled therein.

Figure 1:
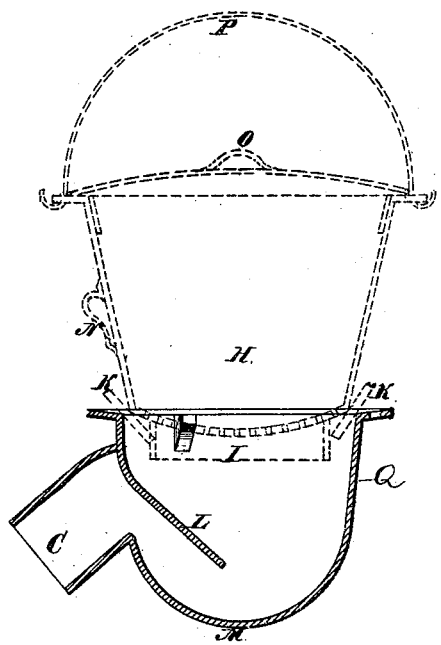
Figure 2:
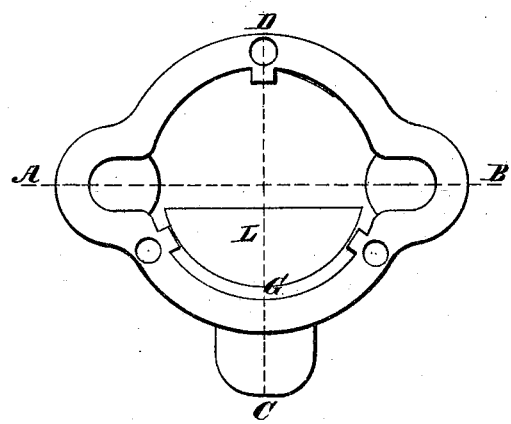
Figure 3:
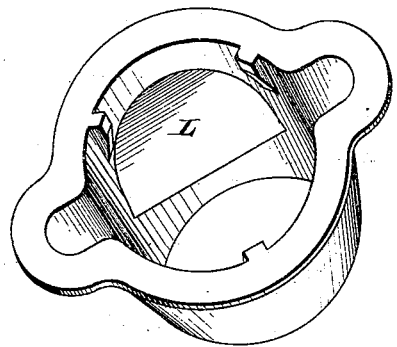
Figure 4:
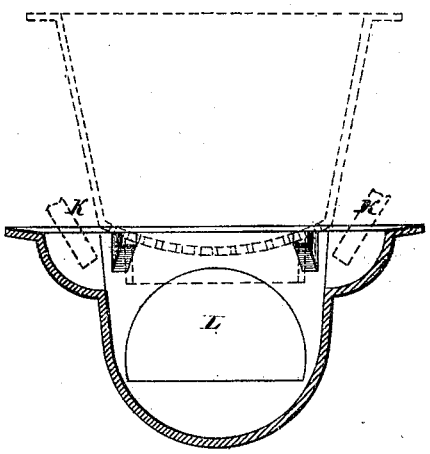

Figure 1 is a sectional view of my invention. Figs. 2 and 3 are top views. Fig. 4 is another sectional view.

H is the receptacle in which the slops are emptied. I are the perforations in the bottom of receptacle or pail, to allow the water to pass through into the trap. O is the cover for the top of receptacle. P is the bail for lifting out the pail when desired. N is the handle at the side of the pail, to assist in emptying out the débris. Q is the trap. L is the dam placed in the trap to prevent the stench from returning. C is the waste-pipe, through which the liquid runs off into the drain to the sewer or catch basin. A and B, Fig. 2, are the openings at the side to receive the waste-pipes from the sinks and wash-tubs. G is the surface-drain for surface-water to pass through into the trap. D is the flange for fastening the trap to the floor by means of nails or screws therein.

My invention or improvement may be made of cast-iron, galvanized iron, brass, copper, or other materials, and can be made round, square, oval, or any shape desired.

Having thus described my slop - pail and trap, with surface-drain combined, what I desire to secure by Letters Patent is—

1. A movable slop - pail, constructed with receptacle H, strainer I, removable cover O, bail P, and side handle N, all in combination, substantially as set forth.

2. The trap Q, with dam L, flange D, surface-drain G, and openings A and B, substantially as described, and for the purpose set forth.

3. The combination of pail H, having bail P, cover O, side handle N, strainer I, with trap Q, having dam L, flange D, surface-drain G, and openings A and B, substantially as specified.

In witness whereof I have hereunto set my hand and seal this 9th day of June, A. D. 1876.

CHARLES H. BURR. [L. S.]

Witnesses:
 G. W. BURR,
 W. H. PECKHAM.